(12) United States Patent
Shapira et al.

(10) Patent No.: US 9,959,314 B2
(45) Date of Patent: May 1, 2018

(54) PERFORMING APPLICATION SEARCH BASED ON ENTITIES

(71) Applicant: Samsung Electronics Co., Ltd., Suwon-si, Gyeonggi-do (KR)

(72) Inventors: Liron Shapira, Palo Alto, CA (US); Michael Harris, Mountain View, CA (US); Jonathan Ben-Tzur, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days. days.

(21) Appl. No.: 14/745,177

(22) Filed: Jun. 19, 2015

(65) Prior Publication Data

US 2015/0286680 A1     Oct. 8, 2015

Related U.S. Application Data

(63) Continuation of application No. 13/839,188, filed on Mar. 15, 2013, now Pat. No. 9,092,527.

(Continued)

(51) Int. Cl.
*G06F 17/30*     (2006.01)
*G06F 3/0481*    (2013.01)
(Continued)

(52) U.S. Cl.
CPC ...... *G06F 17/30477* (2013.01); *G06F 3/0482* (2013.01); *G06F 3/04817* (2013.01);
(Continued)

(58) Field of Classification Search
USPC .................................. 707/706, 771
See application file for complete search history.

(56) References Cited

U.S. PATENT DOCUMENTS

| | | |
|---|---|---|
| 6,353,822 B1 | 3/2002 | Lieberman |
| 7,933,338 B1 | 4/2011 | Choudhry et al. |
| | (Continued) | |

FOREIGN PATENT DOCUMENTS

| | | |
|---|---|---|
| CN | 101350977 A | 1/2009 |
| CN | 101631332 A | 1/2010 |

OTHER PUBLICATIONS

PCT International Search Report and Written Opinion, PCT Application No. PCT/US14/13450, dated Jan. 20, 2015, 13 pages.

(Continued)

*Primary Examiner* — Kim Nguyen
(74) *Attorney, Agent, or Firm* — Jefferson IP Law, LLP

(57) ABSTRACT

In one embodiment, a search query is received from a computing device, the search query including one or more search terms. Based on the one or more search terms, one or more entities are identified from a set of multiple entities. Each of the one or more identified entities is associated with one or more application functionalities. In addition, a set of applications are identified based on the one or more search terms. Based at least on a type of at least one of the identified one or more entities, a determination is made that a particular application from the set of applications supports the at least one of the identified one or more entities. Thereafter, the applications in the set are ranked based in part on the determination that the particular application supports the at least one of the identified one or more entities.

22 Claims, 9 Drawing Sheets

Related U.S. Application Data

(60) Provisional application No. 61/758,704, filed on Jan. 30, 2013.

(51) Int. Cl.
*G06F 3/0482* (2013.01)
*G06F 3/0484* (2013.01)
*H04L 29/08* (2006.01)

(52) U.S. Cl.
CPC .... *G06F 3/04842* (2013.01); *G06F 17/30038* (2013.01); *G06F 17/3053* (2013.01); *G06F 17/3061* (2013.01); *G06F 17/30554* (2013.01); *G06F 17/30604* (2013.01); *G06F 17/30749* (2013.01); *G06F 17/30864* (2013.01); *H04L 67/02* (2013.01)

(56) References Cited

U.S. PATENT DOCUMENTS

| | | |
|---|---|---|
| 8,189,685 B1 | 5/2012 | Choudhry et al. |
| 8,209,623 B2 | 6/2012 | Barletta et al. |
| 8,296,309 B2 | 10/2012 | Brassil et al. |
| 8,364,679 B2 | 1/2013 | Resnick |
| 9,116,918 B1 * | 8/2015 | Kim ................ G06F 17/30241 |
| 2004/0054520 A1 | 3/2004 | Dehlinger et al. |
| 2006/0020662 A1 * | 1/2006 | Robinson ................ G06F 15/16 709/203 |
| 2007/0168413 A1 | 7/2007 | Barletta et al. |
| 2009/0019015 A1 | 1/2009 | Hijikata |
| 2011/0173538 A1 | 7/2011 | Robert et al. |
| 2011/0310047 A1 * | 12/2011 | Moore ................ G06F 3/04883 345/173 |
| 2012/0265779 A1 | 10/2012 | Hsu et al. |
| 2012/0290441 A1 | 11/2012 | Mahaniok et al. |
| 2012/0316955 A1 * | 12/2012 | Panguluri ............. G06Q 30/02 705/14.41 |
| 2013/0018867 A1 | 1/2013 | Regan et al. |
| 2013/0019202 A1 | 1/2013 | Regan et al. |
| 2013/0290319 A1 * | 10/2013 | Glover ................ G06F 17/3053 707/723 |

OTHER PUBLICATIONS

United States Office Action, U.S. Appl. No. 13/839,188, dated Nov. 18, 2014, 16 pages.

Office Action for CN Application No. 2014800065112, dated Feb. 17, 2017, 8 pages.

Search Report for CN Application No. 201480065112, dated Feb. 17, 2017, 2 pages.

* cited by examiner

PERFORMING APPLICATION SEARCH BASED ON ENTITIES

CROSS REFERENCE TO RELATED APPLICATION

This application is a continuation of U.S. patent application Ser. No. 13/839,188, filed on Mar. 15, 2013, which claims the benefit of U.S. Provisional Application No. 61/758,704, filed Jan. 30, 2013, each of which are incorporated by reference in its entirety.

TECHNICAL FIELD

This disclosure relates to techniques for performing application search based on entities.

BACKGROUND

Development of applications has exploded with the introduction of various application delivery channels (e.g., "app" stores). In particular, such application delivery channels enable developers to quickly and efficiently distribute their applications to end users. To enable the end users to rapidly locate relevant software applications, various application search systems have been developed.

Many such application search systems perform searches based on keyword matches. For example, a user provides a particular search query to an application search system. Responsive to the search query, applications associated with keywords included in the search query are identified and search results listing the applications are returned.

DETAILED DESCRIPTION

The Figures (FIGS.) and the following description describe certain embodiments by way of illustration only.

One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Performing searches based on keyword matching often does not provide the most relevant search results (e.g., search results that are closely aligned with an intent indicated by a search query). For example, a user may wish to identify and download relevant applications for the movie TOY STORY. Accordingly, the user provides a search query including the terms "TOY STORY" to a conventional application search system. Responsive to the search query, the conventional application search system performs a keyword search and identifies multiple applications with "TOY STORY" in their titles or descriptions. One problem with such an approach is that an important subset of relevant applications will be missing, including NETFLIX (which allows users to watch TOY STORY), IMDB (which allows users to obtain information about TOY STORY), ROTTEN TOMATOES (which allows users to browse reviews about TOY STORY), and YOUTUBE (which allows users to watch various trailers and extras for TOY STORY). Such a problem occurs because TOY STORY is not associated with the applications as keywords. Such is the case because the terms do not appear in the applications' titles or descriptions.

Figure 1:
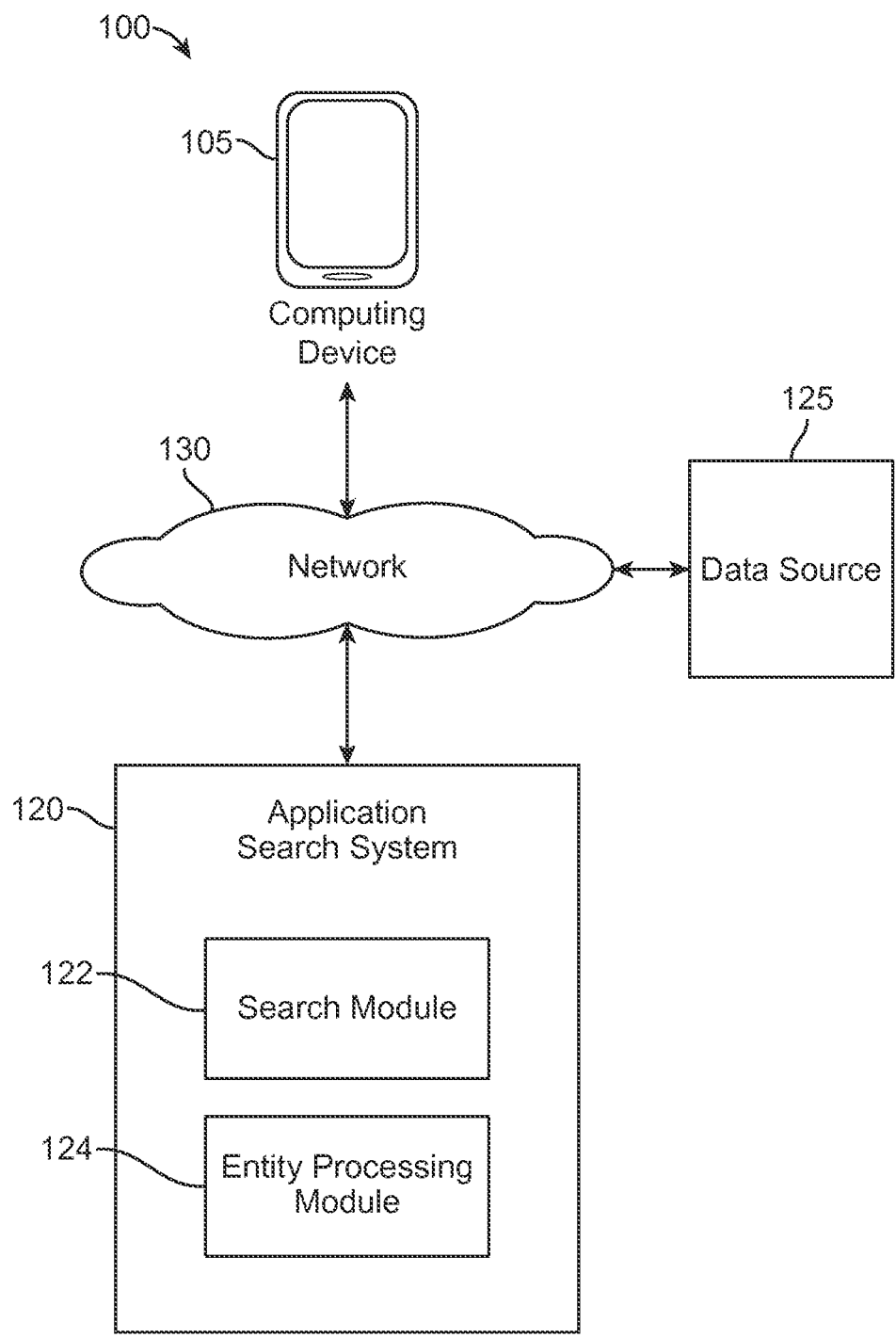
FIG. 1 is an example drawing illustrating a suitable environment for performing application search based on entities.

FIG. (FIG. 1 is a drawing illustrating a typical environment 100 used for performing application (e.g., software programs) searches based on entities. As used herein, an entity may be a logical object or item having one or more entity types, such as a movie entity type, a math entity type, a song entity type, a book entity type, an action entity type (e.g., the word "pay"), a descriptive entity type (e.g, the color "red"), etc. In some instances, entities may be nouns, verbs, and/or adjectives associated with various entity types. As an example, a TOY STORY entity may be associated with a movie entity type. In one aspect, an entity may have one or more containment relationships with one or more applications based on the entity's types. Specifically, an entity may have a containment relationship with a particular application if the entity is associated with an entity type supported for processing by the application. For example, with reference to the previous example, the TOY STORY entity may have a containment relationship with a media player application if the media player application supports playback of movie entity types.

Now referring again to FIG. 1, the environment 100 includes a computing device 205, a data source 125, and an application search system 120 in communication with one another via a network 130. Only one computing device 105, one data source 125, and one application search system 120 are shown in FIG. 1 for purposes of clarity, but those of skill in the art will recognize that typical environments can have hundreds, thousands or millions of computing devices 105 and data sources 125, and can also have multiple application search systems 120. An example architecture for the computing device 105 is described below and with respect to FIG. 9.

The network 130 enables communications between the computing device 105, the data source 125, and the application search system 120. In one embodiment, the network 130 uses standard communications technologies and/or protocols. Thus, the network 130 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 130 can be represented using technologies and/or formats including the hypertext markup language (HTML), the extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 130 can also include links to other networks such as the Internet.

The computing device 105 is an electronic device used by a user to access the application search system 120. The computing device 105 can be any type of computer system, such as a laptop, desktop, workstation, or server. The computing device 105 can also be another device having computer functionality, such as a personal digital assistant (PDA), mobile telephone, tablet device, etc. In one embodiment, the computing device 105 is a conventional computer system executing, for example, a Microsoft Windows-compatible operating system (OS), Apple OS X, UNIX, and/or a Linux distribution. The computing device 105 may additionally be configured to access the functionalities of various applications for varying computing environments. For example, the computing device 105 may be configured to execute a native application stored on the computing device 105. As used herein, a native application may be a software application designed for a specific operating system executed by the computing device 105. As another example, the computing device 105 may be configured to execute a web browser that allows the computing device 105 to access a web application. As used herein, a web application is an application that is executed, at least in part by a web server and accessed by a web browser of the computing device 105.

The data source 125 is a computing system configured to provide at least one or more data records regarding various entities to the application search system 120. For example, the data source 125 may provide a set of data records for various movie entities. In one aspect, the application search system 120 may use the one or more data records to generate an index of entities usable for identifying entities in search queries received from the computing device 105.

The application search system 120 is a computing system configured to perform searches for applications based on search queries received from the computing device 105. In one embodiment, the application search system 120 performs searches for applications based at least on entities identified in the search queries and application support for the identified entities. As shown in FIG. 1, the application search system 120 includes, in some embodiments, at least a search module 122 and an entity processing module 124. The entity processing module 124 may be used to identify and rank entities based on a received search query from the computing device 105. The search module may 122 be used to identify and rank third-party applications based on the received search query to generate a set of search results listing the identified third-party applications. Such third-party applications may be applications that are developed and/or made available by sources different from an operator of the application search system 120. For example, the application search system 120 may be operated by a first company. The applications listed in the set of search results may each have been developed by other companies different from the first company. The applications listed in the set of search results may additionally be accessible from (e.g., downloaded from) systems different from the application search system 120. In one aspect, the ranked entities generated by the entity processing module 124 may be utilized by the search module 122 to rank the identified applications.

Figure 2:
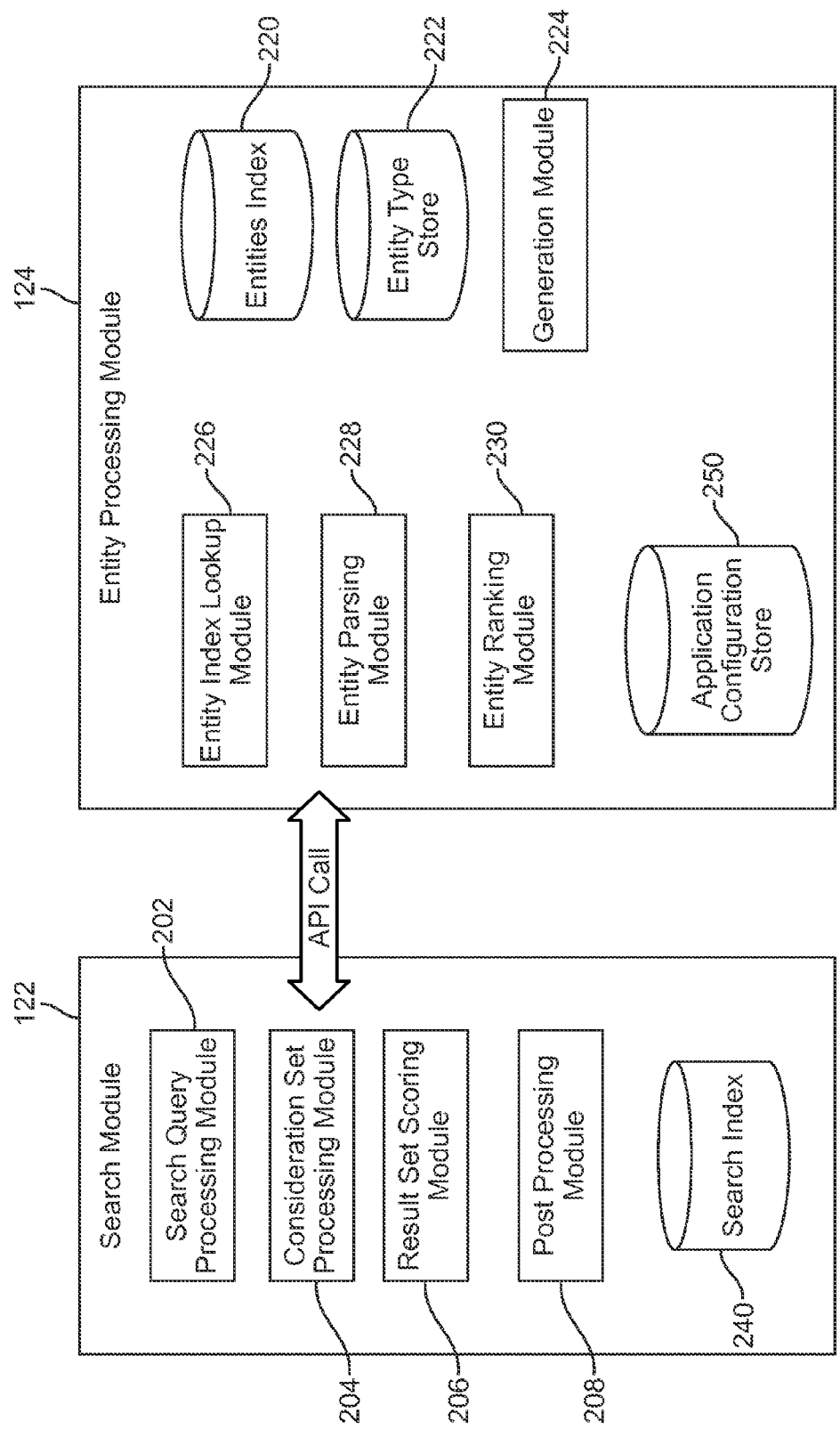
FIG. 2 is an example drawing illustrating modules of an application search system.

Referring now to FIG. 2, it shows a high-level diagram of the search module 122 and the entity processing module 124 of the application search system 120. As shown in FIG. 2, the entity processing module 124 includes various modules for facilitating generation of search results based on entities. In particular, the entity processing module 124 includes an entities index 220, an entity type store 222, an application configuration store 250, a generation module 224, an entities index lookup module 226, an entity parsing module 228, and an entity ranking module 230.

The entity type store 222 includes data regarding different types of entities that may be identified in search queries received from the computing device 105. For example, the entity type store 222 may include various entity type records including information for a movie entity type, a book entity type, a music entity type, a math entity type, a restaurant entity type, etc. Any suitable information may be included in the entity type records. Illustratively, an entity type record for a particular entity type may include at least an identifier for the entity type and a name for the entity type. The entity type record may furthermore indicate any data fields associated with the entity type and/or a set of permitted values for each data field. As an example, an entity type record for a restaurant entity type may include at least the following information:

---

{entityTypeId: 1,
typeName:"Restaurant",
fields:["name", "foodType"]}

---

In one aspect, an entity type record may indicate an association between a corresponding entity type and a parsing function. The parsing function enables identification of an entity having the entity type in a search query. Such parsing functions may be required since certain types of entities cannot be indexed due to the total set of possible entities being very large or infinite in number (e.g., the entities that are combinatorial expressions). As an example, a search query may include a mathematical expression, such as "81*412." Because the number of mathematical expressions is infinite, it would not be possible to index all such expressions. Thus, in order to identify an entity as having a math entity type, a suitable parsing function for identifying well-formed mathematical expressions is required. In one aspect, such a parsing function may be a suitable regular expression.

In one aspect, at least some of the entity type records may be associated with various data source field mappings, keywords and/or other indicators usable for associating a corresponding entity type with a particular entity indicated by a data record retrieved from the data source 125. For example, a particular restaurant entity type may be associated with various keywords indicative of an entity having a restaurant entity type, such as "prix fixe," "lunch special," "steakhouse," etc. The restaurant type entity may also be associated with a data source field mapping indicating certain data fields of data records retrieved from the data source 125 that may include entity type information. Thus, when a data record is retrieved from the data source 125, a determination can be made as to whether an entity indicated by the data record has a restaurant entity type by checking a data field of the data record indicated by the data source field mapping for any of the keywords indicative of an entity having a restaurant entity type.

The entities index 220 is an index of entities configured to enable the identification of entities within a received search query. In one aspect, the entities index may include any suitable data regarding an entity. For example, the entities index 220 may include multiple entity records, where each entity record includes an identifier for the entity, keywords associated with the entity and one or more types of the entity. Each entity record may also include other data based on an entity type for an entity. For example, data for an entity having a "restaurant" entity type may include a name for the entity and a food type associated with the entity. As a specific example, data for an entity having the restaurant entity type may include {name:"Chipotle", foodType: "Mexican"}. As another example, data for an entity having a "movie" entity type may include title data and actor data. As a specific example, data for an entity having the movie entity type may include {title:"Toy Story 3", actors: ["Tom Hanks", "Tim Allen", "Joan Cusack"]}. As yet another example, data for an entity having an "airport" entity type may include airport code data and airport name data. As a specific example, data for an entity having the airport type may include {code:"SFO", name:"San Francisco International Airport"}.

In one aspect, the entities index 220 may be a naïve inverted keyword index. For example, an entity record for the entity TOY STORY may include the following information: {title:"Toy Story 3", actors:["Tom Hanks", "Tim Allen", "Joan Cusack"]}. The entities index 220 may be configured such that the entity record is indexed by the keywords "Toy," "Story," "3," "Tom," "Hanks," "Tim," "Allen," "Joan," and "Cusak." Thus, if any of the aforementioned keywords appear in a received search query, the entity record for the TOY STORY entity would be retrieved.

The application configuration store 250 includes one or more configuration records indicating configuration data and/or other data for one or more applications. In one aspect, each configuration record may indicate the entities that a corresponding application supports. For example, a record for the application Wolfram Alpha may indicate that the application supports math type entities. As another example, the application IMDB may indicate that the application supports television type entities.

The association between entity types and applications may be determined in any suitable manner. In one embodiment, a suitable application crawler may be employed to locate and determine the entity types of various applications (e.g., native applications) by crawling various data sources over a network, such as the Internet. In one specific embodiment, to determine entity types for at least some applications, the application crawler automatically assesses the supported functionalities of the at least some applications by executing and testing the at least some applications. Based on the testing, various entity types may be identified and associated with the at least some applications. Such associations are then stored in the configuration records of the application configuration store 250 corresponding to the at least some applications.

For example, the application crawler may automatically identify and execute a native application. During execution, the application crawler may use a set of test inputs to test the native application. Based on the testing, the application crawler determines the entity types that which the native application supports. Illustratively, the application crawler may execute a native media player application and automatically attempt to have the native media player application open various test files for playback. Those test files that are played successfully by the native media player application (e.g., the native media player application successfully renders audio and/or video streams of the test files) may be determined to be supported by the native media player application. Accordingly, the application crawler determines that the native media player application supports entity types associated with the successfully played test files. Such entity types may be indicated in the configuration record for the native media player application.

In one embodiment, the application configuration store 250 may be accessed by the search module 122 to identify the types of entities supported by various applications. The application configuration store 250 may additionally include other information about applications usable by the search module 122 to generate search results.

The generation module 224 generates the entities index 220. To generate the entities index 220, the generation module obtains one or more data records from the data source 125. Then data source 125 may be any suitable data source, such as FREEBASE, WIKIPEDIA, etc. Each obtained data record from the data source 125 may correspond to an entity. For example, an individual data record obtained from the data source 125 may include information for the TOY STORY entity.

For each obtained data record, the generation module 224 determines one or more entity types associated with the entity corresponding to the data record. Illustratively, the generation module 224 may determine that a TOY STORY entity is associated with a movie entity type. The generation module 224 may determine the entity types associated with an entity in any suitable manner. For example, the generation module 224 may determine, based on the entity type store 222, the keywords and data source field mappings for different entity types. If a data record includes one or more keywords for a particular entity type within certain data fields indicated by the data source field mappings, the generation module 224 determines that the particular entity corresponding to the data record is associated with the particular entity type.

Based on the identified entity types for each entity, the generation module 224 generates one or more entity records for the entity. In one aspect, the data to be included in an entity record is based on the identified type for a corresponding entity. For example, an entity record for an entity corresponding to a movie entity type may include actor information. In one embodiment, the specific data used to populate an entity record may be retrieved from the data record obtained from the data source 125 corresponding to the entity. After generating the entity records for various entities, the generation module 224 builds the entities index 220 based on the entity records. In particular, the entity records may be indexed within the entities index 220 based on the data included in the entity records.

The entity index lookup module 226 identifies entities in the entities index 220 based on a received search query. In one embodiment, the entity index lookup module 226 identifies entities by extracting one or more keywords from the search query, and performing a search for the one or more keywords using the entities index 220. Illustratively, a search query may include the words "TOY STORY 3." Responsive to the request, the entity index lookup module 226 searches the entities index 220 for the keywords Toy, Story, and 3. Based on the entities index 220, the entity index lookup module 226 determines an entity type common amongst the three keywords. In particular, the entity index lookup module 226 determines that all three of the keywords are each at least associated with an entity record having the movie entity type. Thus, the entity lookup module 226 selects the entity record, which in the example is the entity record for TOY STORY 3. Thus, the TOY STORY 3 entity record is selected for use in further processing. For example, the entity record may be passed to the entity parsing module 228 for identification of the entity types associated with the entity.

The entity parsing module 228 identifies entity types within a search query. Identifying of the entity types may be performed in any suitable manner. In one embodiment, the entity parsing module identifies the type of an entity by referencing one or more entity types included in the entity record corresponding to the entity identified by the entity index lookup module 226. In one embodiment, the entity parsing module additionally or alternatively applies a parsing function to a received search query. The parsing function may identify types of entities included in a search query based on certain rules and/or patterns identified in the search query. Illustratively, the parsing function may determine that an entity includes a math entity type based on a pattern match between the search query and a predefined regular expression.

The entity ranking module 230 scores and ranks identified entities in a search query. In particular, the entity ranking module 230 employs various heuristics to score each identified entity by an estimated probability of the entity being "legitimate." For example, based on contextual information for the user (e.g., a geographic location) that provided the search query, the frequency of keywords in the search query, the arrangement of keywords in the search query, historical data for the user (e.g., past application downloads, previously requested searches), etc., the entity ranking module 230 scores each of the identified entities. Illustratively, a search query may include the terms: "tom hanks toy movie." Because several keywords for the TOY STORY entity are included in the search query, the entity ranking module 230 may calculate a relatively high score for the TOY STORY entity. In contrast, another search query may include the terms: "five story toy building." Because few keywords for the TOY STORY entity are included in the search query, the entity ranking module 230 may calculate a relatively low score for the TOY STORY entity. After scoring the identified entities, the entity ranking module 230 ranks the entities using the scores to generate a ranked set of entities. The ranked set of entities may then be provided to the search module 122 for use in ranking any identified applications that match the search query.

Referring again to FIG. 2, the search module 122 includes various modules for generating search results (e.g., a listing of applications) responsive to receiving a search query. In particular, the search module 122 includes a search index 240, a search query processing 202 module, a consideration set processing module 204, a result set scoring module 206, and a post processing module 208. Each of the modules can be processed by a one or more machines (or computer systems), for example, having an architecture as described in the example machine in FIG. 9.

The search index 240 may be an index suitably configured to enable identification of applications based on a received search query. In particular, the search index 240 may include and/or is associated with one or more application records. Each application record may include information regarding one or more attributes of an application. As used herein, an attribute may be any aspect of an application usable for facilitating a search for the application. For example, each application record may indicate a title, a developer, and one or more functionalities corresponding to an application. Illustratively, an application record may indicate that a particular application supports red-eye removal. In one aspect, the search index 240 indexes the application records based on one or more of the application attributes. For example, the search index 240 may index the application records based on one or more application functionality attributes indicated by the application records.

The search query processing module 202 performs preliminary processing of a search query. In one embodiment, the search query processing module 202 receives a search query from, for example, a computing device 105. The search query processing module 202 then provides the received search query (or a portion of the received search query) to the entity processing module 124. The search query processing module 124 may provide the received search query in any suitable manner. For example, as shown in FIG. 2, the search query processing module 202 may perform an application programming interface (API) call to the entity processing module 124. The API call may include any suitable information. In one aspect, the API call may include a command indicating to the entity processing module 124 to identify and rank entities in a search query. The API call may additionally include, as an argument, the search query that which the entity processing module 124 is to use to identify and rank entities. Responsive to providing the search query, the search query processing module 202 receives a set of ranked entities identified from the entity processing module 124. As will be discussed, the set of ranked entities may be used to generate search results for the search query.

The consideration set processing module 204 identifies an initial set of applications (also referred to as a consideration set) determined to be potentially relevant (e.g., aligned with an intent of) to the search query using the search index 240. After identifying the initial set of applications, the consideration set processing module 204 pares down the initial set of applications into a working subset of applications. The consideration set processing module 204 may pare down the initial set of applications in any suitable manner. In one embodiment, the consideration set processing module 204 retrieves a subset of attributes corresponding to each application in the initial set. In one aspect, at least some of the attributes indicate one or more functionalities of the application. For example, an attribute may indicate that a particular application supports the removal of red-eye. Such attributes for each application may be retrieved from a suitable source, such as the search index 240 and/or the application configuration store 250. Based on the subset of attributes for each application, the consideration set processing module 204 generates a score for each application. The score may indicate how closely the subset of attributes of each application matches a determined intent of the search query. Based on the scores for the applications, the consideration set processing module 204 pares down the initial set of applications to generate a working subset of applications.

For example, the consideration set processing module 204 may discard or remove applications that do not meet a threshold score. As another example, the consideration set processing module 204 may select a working subset of applications with the top scores.

The result scoring module 206 scores and ranks applications in the working subset. In one aspect, scoring and ranking of the applications may be based at least in part on the set of ranked entities generated by the entity processing module 124. In particular, for each application in the working subset, the result scoring module performs a lookup into the application configuration store 250 to determine the entities that the application supports. For example, the result scoring module 206 may determine that a media player application supports playback of movie type entities. Thereafter, the result scoring module 206 computes an "entity match" value for each application based at least in part on the number of entities that the application supports from the set of ranked entities and/or the rankings of the entities supported by the application in the set of ranked entities. For example, the result scoring module 206 may generate a higher entity match value for an application if the application supports at least one entity included in the ranked set of entities from the entity processing module 124, and/or supports an entity ranked relatively high in the ranked set. In contrast, the result scoring module 206 may generate a lower entity match value for the application if the application does not support an entity included in the ranked set and/or supports an entity ranked relatively low in the ranked set.

In one aspect, the result scoring module 206 uses the entity match value for each application to influence the scoring and ranking of the applications in the working set. In one embodiment, the result scoring module 206 employs a machine-learned regression model to generate scores for the applications in the working subset. In particular, the result scoring module 206 generates a feature vector for each application in the working subset. Each feature vector corresponding to an application may include feature vectors corresponding to data signals about the application (e.g., information regarding different attributes of the application), data signals for the received search query, and/or any other suitable information. In one embodiment, the feature vector generated for each application may include the entity match values for the application as a feature.

Based on the feature vector, the result scoring module 206 uses the machine-learned regression model to generate scores for each application. In one aspect, because the feature vector for each application includes the entity match value as a feature, the generated scores for each application accounts for the application's support for entities indicated in the search query. In one aspect, the machine-learned regression model may have been previously trained to score applications based at least in part on application support for entities indicated in the search query.

Based on the scores for the applications, the resulting scoring module 206 generates a ranked listing of applications for the search query, where the ranked listing of applications is based at least in part on the entities supported by or correlated to the applications.

In one embodiment, the post processing module 208 performs post processing on the ranked listing of applications. More specifically, the post processing module 208 may obtain display-related metadata for the results list, such as application images (e.g., application screenshots), application descriptions, application videos, etc. Such information may be obtained from any suitable source, such as the application configuration store 250. In one embodiment, the ranked listing of applications is provided to the computing device 105 from which the search query was received. The computing device 105 may present, for display, the received ranked listing of applications to its user.

Figure 3:
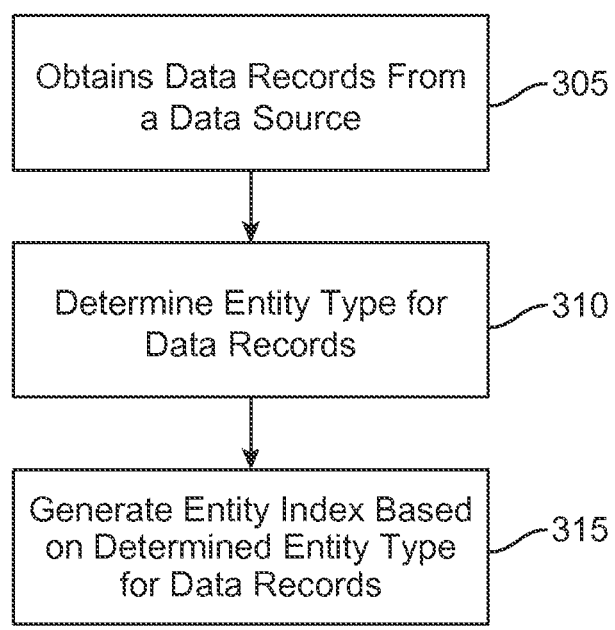
FIG. 3 is an example flow chart illustrating an arrangement of steps for a method for generation of an entities index performed by an entities processing module of the application search system.

FIG. 3 illustrates an example arrangement of steps for a method for generating the entities index 220 performed by the entity processing module 124 according to one embodiment. Other embodiments can perform the steps of the method in different orders and can include different, additional and/or fewer steps. In particular, the entity processing module 124 obtains 305 one or more data records from the data source 125. Each of the data records may correspond to a particular entity. Thereafter, the entity processing module 124 determines entity types 310 for each entity corresponding to a data record from the data source 125. Based on the entity type and data included in the data record for each entity, the entity processing module 124 generates 315 an entity record for the entity. Thereafter, the entity processing module 124 generates 315 an entities index 220 based on data included in the entity record for each entity. In one aspect, the entities index 220 may be structured in a manner such that the entities indicated in a received search query can be identified.

Figure 4:
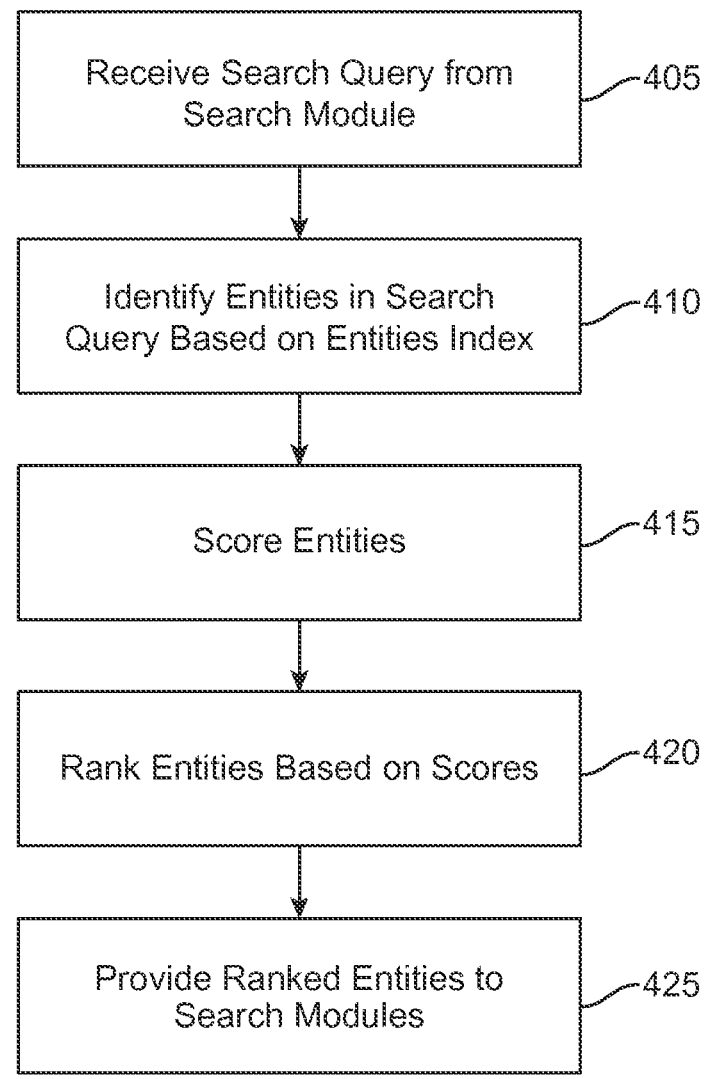
FIG. 4 is an example flow chart illustrating an arrangement of steps for a method for facilitating application search based on entities performed by the entities processing module of the application search system.

FIG. 4 illustrates an example arrangement of steps for a method for identifying entities responsive to a received search query performed by an entity processing module 124 according to one embodiment. Other embodiments can perform the steps of the method in different orders and can include different, additional and/or fewer steps. In particular, the entity processing module 124 receives 405 a search query from the search module 122. The search query may have been received by the search module 122 from a computing device 105 requesting a search for applications. Responsive to receiving the search query, the entity processing module 124 identifies 410 entities in the search query. In particular, the entity processing module 124 identifies keywords in and/or associated with terms of the search query. Based on the keywords, the entity processing module 124 accesses the entities index 220 to identify any entities associated with the keywords. After identifying the entities associated with the keywords, the entity processing module 124 scores 415 each entity. The entity processing module 124 may score each entity in any suitable manner. After scoring the entities, the entity processing module 124 ranks 420 the entities according to the scores. Following ranking of the entities, the entity processing module 124 provides the ranked entities to the search module 122.

Figure 5:
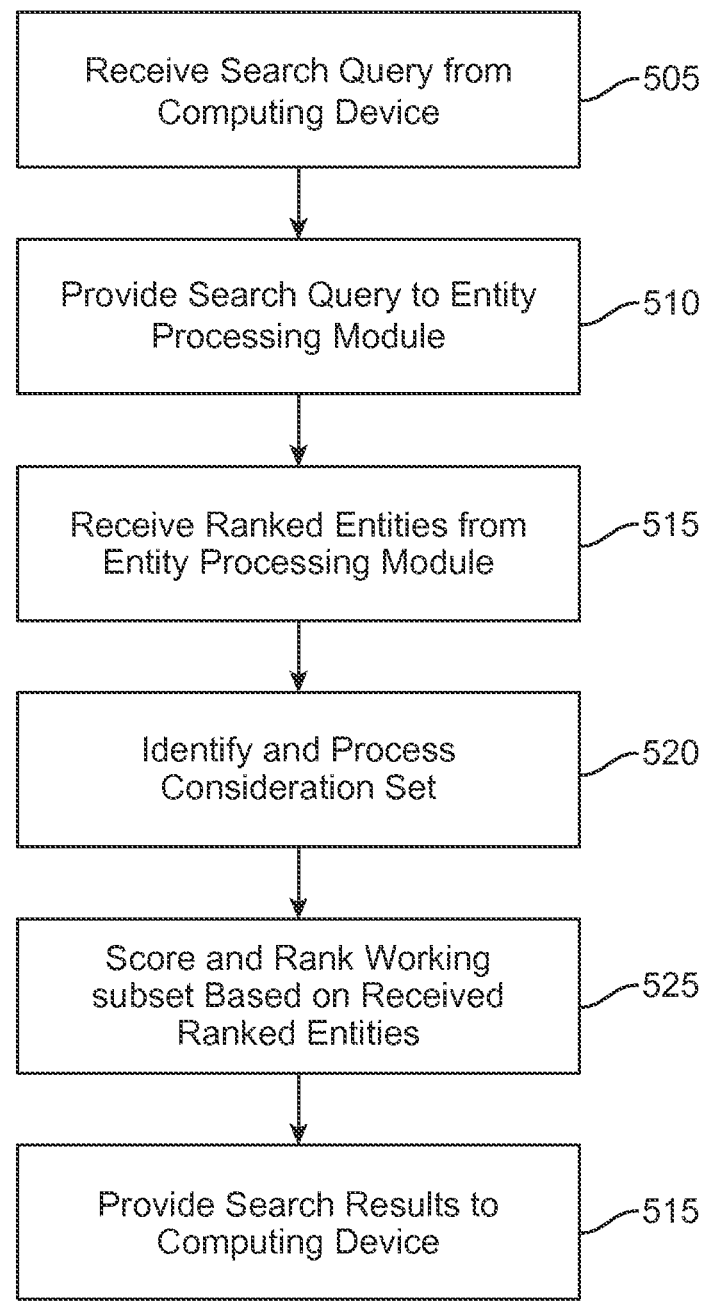
FIG. 5 is an example flow chart illustrating an arrangement of steps for a method for facilitating application search based on entities performed by a search module of the application search system.

FIG. 5 illustrates an example arrangement of steps for a method for facilitating application search based on entities performed by the search module 122 according to one embodiment. Other embodiments can perform the steps of the method in different orders and can include different, additional and/or fewer steps. In particular, the search module 122 receives 505 a search query from a user via a computing device 105 of the user. Responsive to receiving the search query, the search module provides 510 the search query to the entity processing module 124 for identification of any entities associated with the search query as described with respect to FIG. 4. In one aspect, the search module 122 provides the search query to the entity processing module 124 through performing an API call to the entity processing module 124 instructing the entity processing module 124 to identify any entities in the search query.

Thereafter, the search module 122 responsively receives 515 a set of ranked entities from the entity processing module 124 based on the search query. In addition, the search module 122 identifies and processes 520 an initial consideration set of applications. In particular, the search module 122 leverages the search index 240 to identify an initial consideration set of applications determined to be relevant to (e.g., aligned to an intent of) the received search query. The search module 122 additionally pares down the initial consideration set to generate a working subset of applications. Thereafter, the search module 122 scores and ranks 525 the applications in the working subset. In one aspect, scoring and ranking of the applications is based at least in part on the set of ranked entities received from the entity processing module 124. The search module 122 then performs any necessary post processing, and provides 530 a ranked listing of applications to the computing device 105 for presentation (e.g., display on a screen) to the user of the computing device 105.

Figure 6:
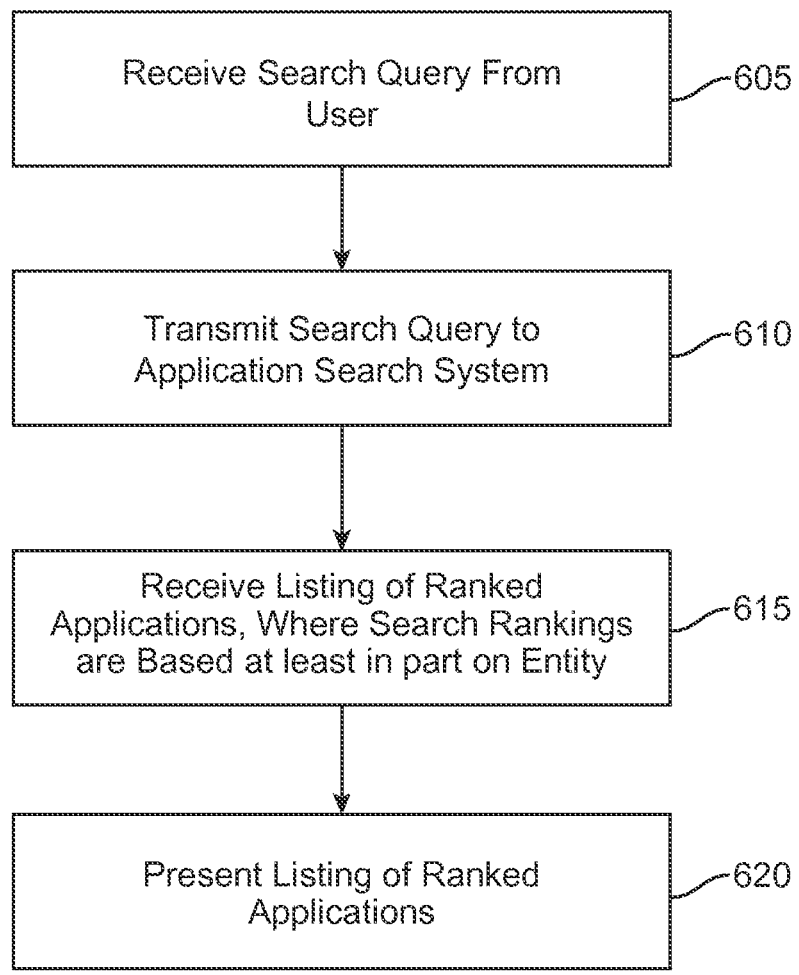
FIG. 6 is an example flow chart illustrating an arrangement of steps for a method for facilitating application search based on entities performed by a computing device according to one embodiment.

FIG. 6 illustrates an example arrangement of steps for a method for facilitating application search based on entities performed by a computing device 105 according to one embodiment. Other embodiments can perform the steps of the method in different orders and can include different, additional and/or fewer steps.

In particular, the computing device 105 receives 605 a search query from a user operating the computing device 105. The search query may be received from the user via a graphical user interface presented by the computing device 105. Responsive to receiving the search query, the computing device 105 transmits 610 the search query to the application search system 120. Thereafter, the computing device 105 receives 615, from the application search system 120, a listing of ranked applications. In one aspect, the search results may be ranked based at least in part on one or more entities indicated in the search query. After receiving the listing of ranked applications, the computing device 105 presents the ranked listing to the user operating the computing device 105 via, for example, a display of the computing device 105.

Figure 7:
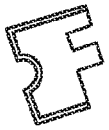
FIG. 7 is an example screenshot illustrating listing of applications presented by the computing device according to one embodiment
Figure 8:
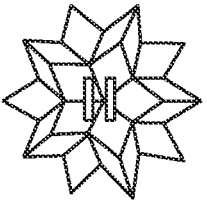
FIG. 8 is an example screenshot illustrating listing of an application presented by the computing device.

Referring now to FIG. 7, it shows an example screenshot of a listing of ranked applications returned by the application search system 120 responsive to a search query for "TOY STORY 3." In the screenshot, search results corresponding to the applications FANDANGO, FLIXSTER, YOUTUBE, and IMDB are shown in the top 5 results because each of the applications supports a movie entity type with which the TOY STORY 3 entity indicated in the search query is associated. Referring now to FIG. 8, it shows an example screenshot of a listing returned by the application search system 120 responsive to a search query for "81*412." In the screenshot, a listing for the WolframAlpha application is shown as being relevant to the search query. In one aspect, the WolfranAlpha application may have been identified during processing of the search query by the application search system 120 through using a parsing function to determine that the search query includes an entity having a math entity type. Thus, the listing for the WolframAlpha application, which supports the math entity type, is returned.

Figure 9:
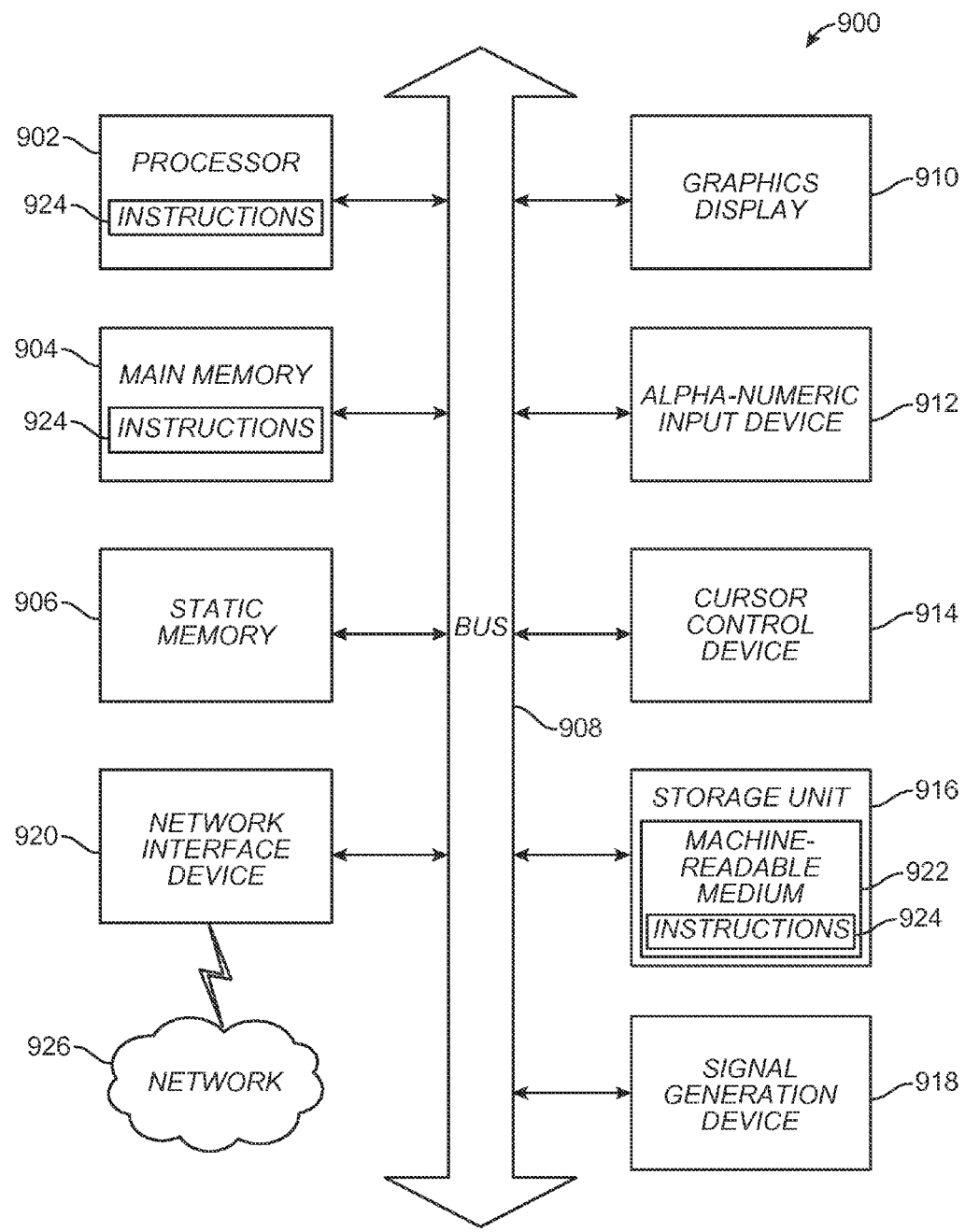
FIG. 9 illustrates components of an example machine able to read instructions from a machine-readable medium and execute them in a processor (or controller).

The disclosed software structures and processes are configured for operation on a machine, e.g., a computing system. FIG. 9 is a block diagram illustrating components of an example machine able to read instructions from a machine-readable medium and execute them in a processor (or controller). Specifically, FIG. 9 shows a diagrammatic representation of a machine in the example form of a computer system 900 within which instructions 924 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine for this configuration may be a mobile computing devices such as a tablet computer, an ultrabook (or netbook) computer, a personal digital assistant (PDA), a cellular telephone, a smartphone, a web appliance, or like machine capable of executing instructions 924 (sequential or otherwise) that specify actions to be taken by that machine. Further, while only a single machine is illustrated, the term "machine" shall also be taken to include any collection of machines that individually or jointly execute instructions 924 to perform any one or more of the methodologies discussed herein.

The example computer system 900 includes one or more processors 902 (e.g., a central processing unit (CPU) and may also include a graphics processing unit (GPU), a digital signal processor (DSP), one or more application specific integrated circuits (ASICs), one or more radio-frequency integrated circuits (or chipset) (RFICs), a wireless fidelity (WiFi) chipset, a global positioning system (GPS) chipset, an accelerometer (one, two, or three-dimensional), or any combination of these). The computer system 900 also includes a main memory 904 and a static memory 906. The components of the computing system are configured to communicate with each other via a bus 908. The computer system 900 may further include graphics display unit 910 (e.g., a plasma display panel (PDP), a liquid crystal display (LCD)) which may be configured for capacitive or inductive touch sensitivity to allow for direct interaction with software user interfaces through the display 910. The computer system 900 may also include alphanumeric input device 912 (e.g., a keyboard), a cursor control device 914 (e.g., a mouse, a trackball, a joystick, a motion sensor, or other pointing instrument), a storage unit 916, a signal generation device 918 (e.g., a speaker), and a network interface device 920, which also are configured to communicate via the bus 908.

The storage unit 916 includes a machine-readable medium 922 on which is stored instructions 924 (e.g., software) embodying any one or more of the methodologies or functions described herein. The instructions 924 (e.g., software) may also reside, completely or at least partially, within the main memory 904 or within the processor 902 (e.g., within a processor's cache memory) during execution thereof by the computer system 900, the main memory 904 and the processor 902 also constituting machine-readable media. The instructions 924 (e.g., software) may be transmitted or received over a network 926 via the network interface device 920.

While machine-readable medium 922 is shown in an example embodiment to be a single medium, the term "machine-readable medium" should be taken to include a single medium or multiple media (e.g., a centralized or distributed database, or associated caches and servers) able to store instructions (e.g., instructions 924). The term "machine-readable medium" shall also be taken to include any medium that is capable of storing instructions (e.g., instructions 924) for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

The embodiments described herein beneficially allow application search systems to provide higher quality search results based on entities. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1 and 2. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA), an application-specific integrated circuit (ASIC), system on a chip (SoC), chipset) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for performing application search through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer program product for performing application search, the computer program product comprising a non-transitory computer-readable storage medium storing instructions that, when executed, cause at least one central processing unit (CPU) of a computing device to:
   display an application search interface on a display of the computing device;
   receive an application search query via the application search interface, wherein the application search query includes an entity having an entity type;
   transmit the application search query via a network interface of the computing device;
   receive application search results in response to transmitting the application search query, wherein
      the application search results indicate a list of ranked applications operable to present information related to the entity,
      the application search results include metadata for the list of ranked applications, and
      the metadata includes respective application images, application titles, and application descriptions; and
   display a first application from the application search results, wherein displaying the first application includes:
      displaying an application icon based on the respective application image for the first application;
      displaying text based on the respective application title and the respective application description for the first application;
      displaying a first indication that is associated with a first user-selectable link for a first edition of the first application, wherein the first indication describes that the first edition of the first application is compatible with a first device; and
      displaying a second indication that is associated with a second user-selectable link for a second edition of the first application, wherein the second indication describes that the second edition of the first application is compatible with a second device.

2. The computer program product of claim 1, wherein, in response to the entity type being a movie entity:
   the application search results indicate that the entity corresponds with a movie object;
   the first application enables playback of the movie object and/or displays a review of the movie object; and
   displaying the text includes indicating that the first application enables the playback of the movie object and/or displays the review of the movie object.

3. The computer program product of claim 2, wherein, in response to the entity type being the movie entity:
   the application search results further include title data and actor data for the movie object; and
   displaying the first application further includes:
      displaying a movie title for the movie object based on the title data; and
      displaying one or more actor names for the movie object based on the actor data.

4. The computer program product of claim 2, wherein, in response to the entity type being the movie entity, the instructions further cause the CPU to:
   receive a selection of the first user-selectable link associated with the first application; and
   in response to receiving the selection of the first user-selectable link, display an application screen of the first edition of the first application that plays the movie object.

5. The computer program product of claim 1, wherein, in response to the entity type being a book entity:
   the application search results indicate that the entity corresponds with a book object;
   the first application enables rendering of the book object and/or displays a review of the book object; and
   displaying the text includes indicating that the first application enables the rendering of the book object and/or displays the review of the book object.

6. The computer program product of claim 1, wherein, in response to the entity type being a song entity:
   the application search results indicate that the entity corresponds with a song object; and
   the first application enables playback of the song object and/or displays a review of the song object; and
   displaying the text includes indicating that the first application enables the playback of the song object and/or displays the review of the song object.

7. The computer program product of claim 1, wherein displaying the text includes indicating that the first application includes the entity.

8. The computer program product of claim 1, wherein the application titles and the application descriptions in the metadata indicated by the application search results include terms that are different from search terms in the application search query.

9. A computing device comprising:
   a display screen;
   a memory;
   a transceiver; and
   a computing processor that executes computer-readable instructions that, when executed by the computing processor, cause the computing processor to:
      display an application search interface on the display screen;
      receive an application search query via the application search interface, wherein the application search query includes an entity having an entity type;
      transmit the application search query via the transceiver;
      receive application search results in response to transmitting the application search query, wherein:

the application search results indicate a list of ranked applications operable to present information related to the entity, the application search results include metadata for the list of ranked applications, and the metadata includes respective application images, application titles, and application descriptions; and display a first application from based on the application search results, wherein displaying the first application includes:

displaying an application icon based on the respective application image for the first application;

displaying text based on the respective application title and the respective application description for the first application;

displaying a first indication that is associated with a first user-selectable link for a first edition of the first application, wherein the first indication describes that the first edition of the first application is compatible with a first device; and displaying a second indication that is associated with a second user-selectable link for a second edition of the first application, wherein the second indication describes that the second edition of the first application is compatible with a second device.

10. The computing device of claim 9, wherein, in response to the entity type being a movie entity:

the application search results indicate that the entity corresponds with a movie object;

the first application enables playback of the movie object and/or displays a review of the movie object; and displaying the text includes indicating that the first application enables the playback of the movie object and/or displays the review of the movie object.

11. The computing device of claim 10, wherein, in response to the entity type being the movie entity:

the application search results further include title data and actor data for the movie object; and displaying the first application further includes:

displaying a movie title for the movie object based on the title data; and displaying one or more actor names for the movie object based on the actor data.

12. The computing device of claim 10, wherein, in response to the entity type being the movie entity:

receive a selection of the first user-selectable link associated with the first application; and in response to receiving the selection of the first user-selectable link, display an application screen of the first edition of the first application that plays the movie object.

13. The computing device of claim 9, wherein, in response to the entity type being a book entity:

the application search results indicate that the entity corresponds with a book object;

the first application enables rendering of the book object and/or displays a review of the book object; and displaying the text includes indicating that the first application enables the rendering of the book object and/or displays the review of the book object.

14. The computing device of claim 9, wherein, in response to the entity type being a song entity:

the application search results indicate that the entity corresponds with a song object; and the first application enables playback of the song object and/or displays a review of the song object; and displaying the text includes indicating that the first application enables the playback of the song object and/or displays the review of the song object.

15. The computing device of claim 9, wherein displaying the text includes indicating that the first application includes the entity.

16. The computing device of claim 9, wherein the application titles and the application descriptions in the metadata indicated by the application search results include terms that are different from search terms in the application search query.

17. A computer-implemented method for displaying application search results, the computer-implemented method comprising:

displaying, by a processing unit of a computing device, an application search interface on a display screen of the computing device;

receiving, at the processing unit, an application search query via the application search interface, wherein the application search query includes an entity having an entity type;

transmitting, by the processing unit, the application search query via a transceiver of the computing device;

receiving, by the processing unit, application search results in response to transmitting the application search query, wherein:

the application search results indicate a list of ranked applications operable to present information related to the entity, the application search results include metadata for the list of ranked applications, and the metadata includes respective application images, application titles, and application descriptions; and displaying, by the processing unit, a first application based on the application search results, wherein displaying the first application includes:

displaying an application icon based on the respective application image for the first application;

displaying text based on the respective application title and the text based on the respective application description for the first application;

displaying a first indication that is associated with a first user-selectable link for a first edition of the first application, wherein the first indication describes that the first edition of the first application is compatible with a first device; and displaying a second indication that is associated with a second user-selectable link for a second edition of the first application, wherein the second indication describes that the second edition of the first application is compatible with a second device.

18. The computer-implemented method of claim 17, wherein, in response to the entity type being a movie entity:

the application search results indicate that the entity corresponds with a movie object;

the first application enables playback of the movie object and/or displays a review of the movie object; and displaying the text includes indicating that the first application enables the playback of the movie object and/or displays the review of the movie object.

19. The computer-implemented method of claim 18, wherein, in response to the entity type being the movie entity:

the application search results further comprise title data and actor data for the movie object; and displaying the first application includes:
  displaying a movie title for the movie object based on the title data; and
  displaying one or more actor names for the movie object based on the actor data.

20. The computer-implemented method of claim 18, further comprising:
  receiving a selection of the first user-selectable link associated with the first application; and
  in response to receiving the selection of the first user-selectable link, displaying an application screen of the first edition of the first application that plays the movie object.

21. The computer program product of claim 1, wherein:
  displaying the first application further includes displaying text that is associated with a third user-selectable link for the first application; and
  the text includes a name of the entity, the application title of the first application, and information indicating that user selection of the third user-selectable link will initiate a search within the first application for the entity.

22. The computer program product of claim 1, wherein:
  the first indication includes text identifying a first device type using a first operating system; and
  the second indication includes text identifying a second device type using the first operating system.

* * * * *